March 2, 1943. J. BARNEY 2,312,953
SHEERNESS METER
Filed April 30, 1941
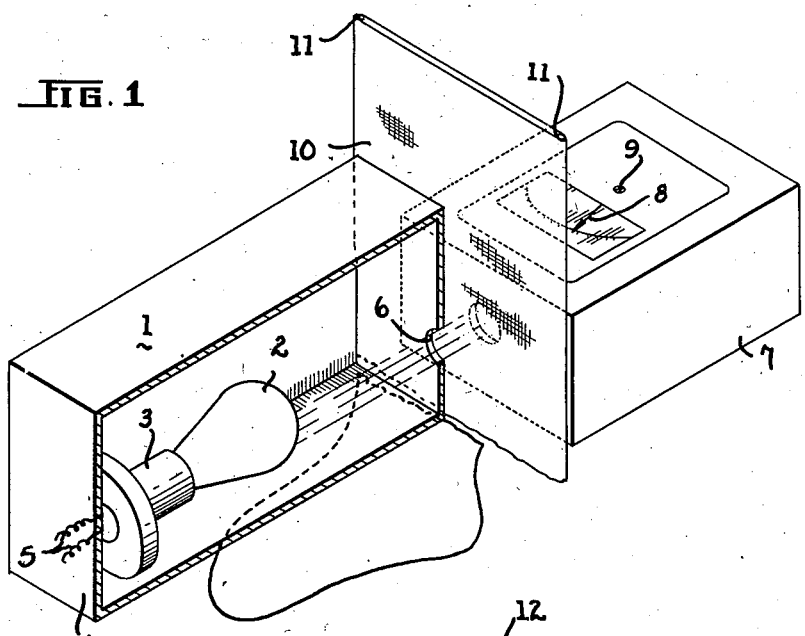
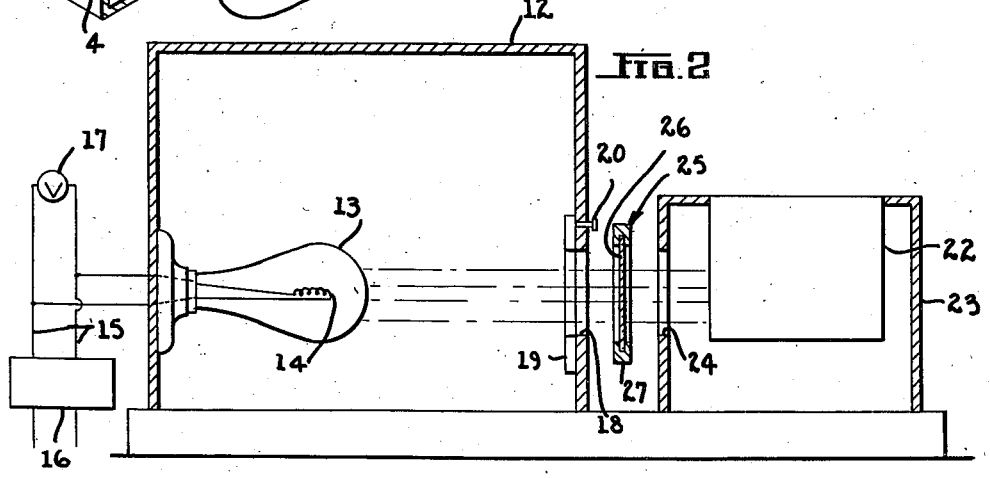
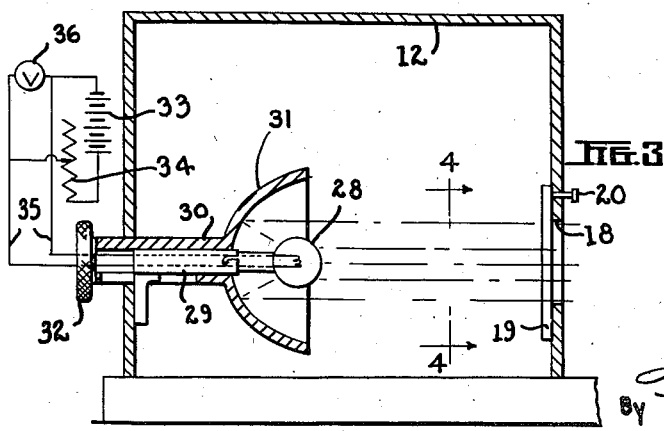
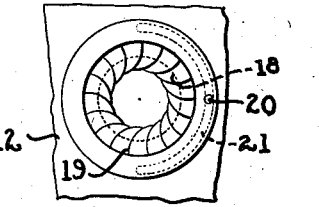
INVENTOR
JEROME BARNEY
By
ATTORNEYS Patented Mar. 2, 1943

2,312,953

UNITED STATES PATENT OFFICE 2,312,953

SHEERNESS METER

Jerome Barney, Bethlehem, Pa., assignor to The R. K. Laros Silk Co., Bethlehem, Pa., a corporation of Pennsylvania Application April 30, 1941, Serial No. 391,155

3 Claims. (Cl. 88—14)

The present invention relates to testing or measuring apparatus, and more particularly to devices for accurately determining the sheerness of fine fabrics.

It has been customary to gauge the sheerness of thin knitted material by comparative appearance and inspection of the material, but this practice does not give accurate results since it depends on the observation of the person making the test; also the manner in which the test is conducted, for example, as to whether the fabric is being stretched or not, and finally depends on the shade of the material as obviously a darker shade will appear less sheer than one of lighter color.

Another way of determining sheerness is by studying the characteristics of the weave or knit through a suitable magnifying glass, and observing the number of threads per inch, yarn diameters, courses per inch, stitches per inch, loop formation, and the general characteristics of the fabric. This practice, while being fairly accurate, is somewhat difficult and tedious unless the manufacturer's specifications are at hand.

The primary object of the present invention is to provide a meter which may be readily operated by inexperienced help, and which gives an accurate measurement of sheerness or of the degree of covering power of women's hose, or other knitted or woven material, even when no information is available from the manufacturer.

Another object is to provide a device for measuring the sheerness of thin knitted material in terms of its translucency, and employing agencies of an accurate reproducible character.

The final object is to provide an improved apparatus for determining the index of sheerness of ladies' hose of all colors and shades, and translating the index to a common standard so that the hose may be compared solely on the basis of sheerness and not color or shade.

These objects are attained, in brief, by subjecting a given area of the knitted or woven material to light of standard intensity and of proper color, and thereafter accurately measuring the light transmitted through the area by a calibrated instrument which reads in terms of sheerness or degree of covering power of the material. The light intensity is maintained strictly constant, and the color of the light is changed depending on the shade of the material, the light measurement being preferably obtained by a standard portable form of light meter, the scale of which is suitably indexed and calibrated.

The invention will be better understood when the specification is perused in connection with the accompanying drawing.

In the drawing:

Figure 1 is a perspective view of the improved apparatus partly broken away to expose the light source, and showing the position of the fine fabric with respect to the sheerness meter.

Figure 2 is a longitudinal section of a modified form of the improved sheerness-determining apparatus.

Figure 3 is a sectional view of still another embodiment of the invention, but showing only the lamp portion of the modified structure.

Figure 4 is a sectional view taken on the line 4—4 of Figure 3, and looking in the direction of the arrows.

Referring more particularly to Figure 1, reference numeral 1 designates a light insulated box or casing containing an incandescent lamp 2 mounted in a socket 3, which is secured to one end 4 of the box. Conductors 5 are taken through the end 4 of the box and suitably insulated from one another. The lamp 2 is thus positioned lengthwise of the box. The box at the opposite end is provided with a round opening 6 of any suitable and predetermined size, through which the light from the lamp 2 is projected in the form of a beam.

Directly opposite the opening 6 there is a light meter 7, of any suitable and well known type, preferably contained in a rectangular casing, with the light sensitive surface positioned at the nearer end of the casing. A convenient form of light meter may be of the non-liquid non-electronic type, for example, an instrument which employs iron selenide which when properly treated has the property of generating electromotive force when subjected to light. This electromotive force is applied to the terminals of a microammeter contained within the casing 7, which actuates a needle pointer 8 adapted to swing over a scale. Photometers of this type are available on the market and are made in pocket sizes so as to be readily portable. The movement of the index pointer 8 may be adjusted by a screw 9, which is usually provided on meters of this character.

When the apparatus, such as described, is to be employed for measuring the sheerness of fine fabrics such as women's hose wear, the opening 6 of the box 1 is placed adjacent the light sensitive element of the light meter 7, leaving just sufficient space between the casings 1 and 7 for the insertion of a double thickness of hose, indicated at 10. In order to present the hose as a flat surface to the light beam, thereby preventing wrinkles, etc. and improper indications of sheerness, the hosiery is held firmly between a pair of spaced uprights, indicated at 11, suitably supported from a base (not shown). Under these conditions the light emanating from the end of the lamp 2 will pass through the opening 6 and through the double thickness of hosiery, finally impinging on the light sensitive unit of the meter 7. Assuming that the latter has been calibrated by experiment with hosiery of known and different sheerness, the degree with which the fabric 10 permits the light to pass may be indicated directly on the meter 7 in terms of the degree of sheerness. In view of the fact that the uprights 11 have a definite position with respect to the casings 1, 7 so as to bring the fabric 10 in a definite positional relationship with respect to the lamp 2 and the light meter, accurate comparison of the sheerness of successively tested fabrics can be made.

Readings should be taken at regular intervals down the leg of the stocking. For reasons of elasticity, many hosiery manufacturers knit more courses per inch in the knee of the stocking, which will necessarily make the stocking more dense and by definition less sheer. For true comparisons of sheerness, a stocking should be pulled down over a standard form or leg shape and the sheerness reading taken through double thickness of fabric and at similar places in the stocking. It is also possible that specimens could be mounted in a frame and sheerness be measured through a single thickness of fabric.

In order for the frame to accommodate different sizes of hose without excessive stretching, the uprights 11 may be made adjustable so as to move toward or away from one another on a suitable base, or if desired, the uprights may be permanently spaced a predetermined distance from one another to form a set of supports which may be substituted for one another in case the size of the hose is changed. Thus the hose will be presented to the light in a perfectly flat and uniformly stretched condition and preferably normal to the beam of light.

In case a light meter of the iron selenide type is employed, the resistance of the light sensitive element varies practically lineally with the volume of light which reaches the light sensitive unit. Thus the movement of the needle 8 will reflect accurately any changes in the amount of light passed through a limited predetermined area of the hose. The sheerness scale on the meter may record units from one to one hundred, or any other convenient scale, to denote degrees of sheerness.

The apparatus shown in Figure 2 is of particular usefulness in measuring the sheerness of hosiery, the color of which may vary from sample to sample. In this figure reference numeral 12 designates a box similar to the inclosure 1 of Figure 1 and containing a light source, exemplified as an incandescent lamp 13. The filament of lamp is illustrated at 14 and is energized from the mains 15, in which a voltage stabilizer 16 may be employed to assure the application of a constant voltage to the lamp filament. This voltage may be indicated at the voltmeter 17. It may be desirable to employ a storage battery for the electric mains 15, in which case no voltage stabilizer is necessary. At the side of the box opposite from the lamp there is an opening 18, which is preferably provided on the interior with an iris diaphragm, indicated at 19, and adjustable by a pin 20 which extends to the exterior of the box. By moving the pin through a semicircular groove 21 (Figure 4) the size of the aperture of the diaphragm can be changed, as is well known in the camera art. The light sensitive meter 22 is contained in and suspended from the top of a box 23 having an opening 24.

There is a filter, generally designated 25, interposed between the openings 18 and 24, the purpose of which will now be explained. This filter may comprise a sheet of glass 26 supported in a frame 27, which has an opening sufficiently large to permit all of the light leaving the opening 18 to pass through the filter. One of the purposes of the filter is to offset any inaccuracies of sheerness indicated at the light meter and which might be introduced, due to different colors or shades of successively presented fabrics. Moreover, certain types of light sensitive surfaces do not respond uniformly to colors throughout the visible light spectrum so that correction of this non-uniformity of response may be necessary. Thus a properly colored filter would tend to prevent a dark shade of hose from registering less sheerness than a lighter shade of hose when both hose are fabricated in the same manner except as to color, and in addition would tend to offset any non-uniformity of response of the light sensitive unit to differences of color. A filter of properly selected color may also prevent a violent movement of the needle 8 when white hose are introduced to the light after the light sensitive unit has been calibrated for relatively dark colored hose. Under each of the foregoing conditions the filter 25 would remain in place during the testing operation, and the hosiery would be introduced between the filter and the opening 24. Instead of relying on the filter to prevent an off-scale indication of sheerness, in the case of light colored hosiery, the amount of light transmitted through the diaphragm 19 may be reduced by moving the pin 20 over a graduated scale.

The filter 25 also finds considerable use during the calibration of the apparatus in that adjustments may be made at the light sensitive device to simulate the different color effects produced at the light sensitive element by the different colors of the sample hosiery. Thus filters having colors which correspond to the colors of hosiery may be successively interposed between the two casings, and suitable corrections made at the light sensitive meter to offset the differences in the colors of the hosiery which is being tested. In this case the filter 25 is removed during the hosiery testing operation, assuming that proper color corrections have been made at the light meter. It is therefore apparent that by the use of the filter 25 and the iris diaphragm 19 all sorts of adjustments, calibrations and corrections may be introduced at the light meter so as to increase the range of usefulness of the apparatus in measuring the quality of sheerness of hosiery, regardless of shade, hue or color. Further calibrations can be introduced by varying the distance between the boxes 12 and 23 and by changing the voltage applied to the filament of the lamp.

Figure 3 shows a light source 28 mounted in a bayonet socket 29, on which is adapted to slide a sleeve 30 carrying a parabolic bowl 31 coated with a light-reflecting material (not shown). The sleeve 30 is extended to the exterior of the box 12 and terminates in a knob 32, so that by pulling the latter to the left the bowl 31 is caused to move with respect to the lamp 28 and thus vary the size of the beam which is projected through the opening 18. The latter may be provided with an iris diaphragm 19, as explained in connection with Figure 2. The filament of the lamp 28 is energized from a battery 33, connected through a rheostat 34 to the conductors 35. A voltmeter 36 may be connected across the conductors to determine the voltage applied to the filament by the manipulation of the rheostat. It will be understood that a light sensitive device similar to that explained in connection with Figure 2 is used with the apparatus shown in Figure 3, and if desired, a light filter 25 may also be employed for any one of the reasons explained in connection with the earlier figure. The fact that the parabolic mirror 31 may be moved right or left with respect to the lamp 28 provides still further adjustment of the light which passes through the opening 18 and is projected through the hosiery onto the suitably calibrated light meter.

From the foregoing it is evident that I have disclosed an apparatus for measuring the sheerness of fine fabrics, such as women's hosiery, with any degree of accuracy desired and taking into account the effects that the different colors of the fabric may have in either preventing or retarding the propagation of the light. After the apparatus has been set up and fully calibrated for a standard color of hosiery, it is a very simple matter for the operator to successively insert and remove the fabrics from the apparatus, testing the fabric under exactly the same conditions of light, so that the indications given at the light meter represent absolutely true comparisons of the respective sheerness.

It will be understood that I desire to comprehend within this invention such modifications as come within the scope of the claims and the invention.

Having thus fully described my invention, what I claim as new and desire to secure by Letters Patent, is:

1. Apparatus for measuring the sheerness of women's hosiery, said apparatus comprising a light source contained in an enclosure provided with an opening, said light source being constituted of an electric lamp to which energy is supplied from a constant voltage source, a diaphragm of adjustable size being secured over said opening, a second inclosure having an opening presented to the opening in the first inclosure and containing a light sensitive device, said device being provided with a pointer which moves over a scale calibrated in degrees of sheerness, said inclosures being spaced apart a sufficient distance to receive a double thickness of the hosiery through which light is projected onto the light sensitive unit for determining the degree of sheerness of the hosiery, a stretching frame for supporting the hosiery between said enclosures, and a light filter interposed between the hosiery and the opening in the first-mentioned inclosure, the color of the light filter being approximately the same as the color of the hosiery which is being tested.

2. Apparatus for measuring the sheerness of women's hosiery, said apparatus comprising a light source contained in an enclosure provided with an opening, said light source being constituted of an electric lamp to which energy is supplied from a constant voltage source, a diaphragm of adjustable size being secured over said opening, a second enclosure having an opening presented to the opening in the first enclosure and containing a light sensitive device, said device being provided with a pointer which moves over a scale calibrated in degrees of sheerness, said enclosures being spaced apart a sufficient distance to receive a double thickness of the hosiery through which light is projected onto the light sensitive unit for determining the degree of sheerness of the hosiery, and a light filter interposed between the hosiery and the opening in the first mentioned enclosure.

3. Apparatus for measuring the sheerness of women's hosiery, said apparatus comprising a light source contained in an enclosure provided with an opening, said light source being constituted of an electric lamp to which energy is supplied from a constant voltage source, a second enclosure having an opening presented to the opening in the first enclosure and containing a light sensitive device, said device being provided with a pointer which moves over a scale calibrated in degrees of sheerness, and a stretching frame for supporting the hosiery in doubled condition between said enclosures.

JEROME BARNEY.